(12) United States Patent
Lee et al.

(10) Patent No.: US 11,492,817 B2
(45) Date of Patent: Nov. 8, 2022

(54) CONNECTION SYSTEM FOR VEHICLE AND HOUSE

(71) Applicants: Hyundai Motor Company, Seoul (KR); Kia Motors Corporation, Seoul (KR)

(72) Inventors: Sang Heon Lee, Seoul (KR); Jin Ho Hwang, Seoul (KR); Dong Eun Cha, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 565 days.

(21) Appl. No.: 16/519,774

(22) Filed: Jul. 23, 2019

(65) Prior Publication Data

US 2020/0276907 A1    Sep. 3, 2020

(30) Foreign Application Priority Data

Feb. 28, 2019   (KR) .................... 10-2019-0024319

(51) Int. Cl.
*E04H 6/42*     (2006.01)
*G07C 9/32*     (2020.01)
*G07C 5/08*     (2006.01)

(52) U.S. Cl.
CPC ............... *E04H 6/42* (2013.01); *G07C 5/08* (2013.01); *G07C 9/32* (2020.01)

(58) Field of Classification Search
CPC .......... E04B 1/3431; E04H 6/426; E04H 6/42
See application file for complete search history.

(56) References Cited

U.S. PATENT DOCUMENTS

| | | | | |
|---|---|---|---|---|
| 2,840,866 | A | * | 7/1958 | Paulsen ................. E04B 1/3431 52/79.8 |
| 4,499,696 | A | * | 2/1985 | Freeauf ............... E04B 1/34336 52/79.8 |
| 6,330,766 | B1 | * | 12/2001 | Brownlee, III ........... E04H 1/02 52/79.8 |
| 11,142,081 | B2 | * | 10/2021 | Cha ......................... B60L 53/14 |
| 2019/0004487 | A1 | * | 1/2019 | Yuzawa ................. G05B 15/02 |
| 2020/0276907 | A1 | * | 9/2020 | Lee .......................... B60L 53/60 |
| 2020/0324630 | A1 | * | 10/2020 | Cha .......................... E04H 1/02 |

FOREIGN PATENT DOCUMENTS

| | | |
|---|---|---|
| DE | 102016209099 A1 | 7/2017 |
| JP | 2009040545 A | 2/2009 |
| KR | 20150041833 A | 4/2015 |
| NO | 2019003334 A1 | 1/2019 |

\* cited by examiner

*Primary Examiner* — Kaitlin S Joerger
(74) *Attorney, Agent, or Firm* — Fox Rothschild LLP

(57) ABSTRACT

A connection system for a vehicle and a house is provided. The system forms a space in which the interior of the vehicle and the interior of the house are connected, when the vehicle and the house are connected with both a door of the vehicle and an entrance of the house open.

15 Claims, 7 Drawing Sheets

CONNECTION SYSTEM FOR VEHICLE AND HOUSE

CROSS REFERENCE TO RELATED APPLICATION

The present application claims priority to Korean Patent Application No. 10-2019-0024319, filed Feb. 28, 2019, the entire contents of which is incorporated herein for all purposes by this reference.

BACKGROUND

1. Field of the Disclosure

The present disclosure relates to a connection system for a vehicle and a house, and more particularly, to a connection system that extends the interior of a house to the interior of a vehicle by connecting the vehicle and an opening of the house when the vehicle is parked, and providing a sealing structure between the vehicle and the house to prevent inconvenience.

2. Description of the Prior Art

Recently, as self-driving vehicles and electric vehicles are being developed, vehicles are merging with information and communication technologies (ICT) and other technologies. Accordingly, vehicles are being developed to function as a medium capable of improving user convenience. As part of this technological development, vehicles being highlighted as dwelling spaces, and for example, combining a vehicle with a house as a portion of a life space may be considered.

In particular, various technologies should be supported, that is, an entrance of a house and a door of a vehicle should be connected, and the joint of the door should be sealed to use the interior of the vehicle as an actual living space. Accordingly, the vehicle should be parked at an accurate position and sealing should be secured when the vehicle and house or other similar structure are connected; however, no technology has been developed yet for this configuration.

The description provided above as a related art of the present disclosure is merely for helping understand the background of the present disclosure and should not be construed as being included in the related art known by those skilled in the art.

SUMMARY

The present disclosure provides a connection system for a vehicle and a house, the connection system expanding the interior of a house to the interior of a vehicle by connecting the vehicle and an opening of the house when the vehicle is parked, and providing a sealing structure between the vehicle and the house to prevent inconvenience.

In view of the above aspect, a connection system for a vehicle and a house according to the present disclosure may include: a flange provided along the edge of an opening of a door of a vehicle; a weather strip disposed at the flange, extending along the flange, and exposed outside the vehicle; and a sealing module disposed at an entrance of a house, extending along the edge of the entrance, and sealing the portion between the vehicle opening and the house entrance by abutting the weather strip when the vehicle and the house are connected. When the vehicle and the house are connected with both the door of the vehicle and the entrance of the house open, a space with the interior of the vehicle and the interior of the house connected to each other is formed.

The door of the vehicle may be disposed on a side of the vehicle and may be opened upward, and thus, the vehicle and the house may be connected with the side of the vehicle and a side wall of the house. The door of the vehicle may be disposed on the rear of the vehicle, may be separated when opening, and may be opened rearward, and thus, the vehicle and the house may be connected with the rear of the vehicle and a side wall of the house, and the door of the vehicle may be opened toward the floor in the interior of the house.

Additionally, the door of the vehicle may be disposed on the rear of the vehicle and may be separated when opening, and thus, the vehicle and the house may be connected with the rear of the vehicle and a side wall of the house, and the door of the vehicle may be opened toward the interior of the house and the separate door may be positioned in the interior of the house in an opening state. The sealing module may include stoppers, a locking device may be disposed at the entrance of the house, the sealing module may be detachably coupled to the entrance, and the stoppers may be locked by the locking device when the sealing module and the entrance are combined, whereby the sealing module may be mounted on the house.

The sealing module may include a base, a stretching portion disposed on the base, and a contact portion coupled to an end of the stretching portion. When the vehicle and the house are connected, the contact portion may approach the vehicle from the base by the stretching portion and may abut the weather strip, thereby sealing the portion between the vehicle opening and the house entrance. The sealing module may protrude toward the vehicle and may surround the flange. The inner side of the sealing module may abut the weather strip of the vehicle when the vehicle and the house are combined, thereby sealing the portion between the opening of the vehicle and the house entrance.

The sealing module may stretch toward the vehicle when the vehicle and the house are combined. When the sealing module is stretched, the flange of the vehicle may surround the sealing module and the outer side of the sealing module may abut the weather strip of the vehicle, thereby sealing the portion between the vehicle opening and the house entrance. The connection system of the present disclosure may further include: a vehicle recognizer disposed outside the house and configured to detect the vehicle; and a vehicle guide configured to guide the vehicle to a connection position at a side of a house entrance when the vehicle is detected as an authorized vehicle by the vehicle recognizer.

When the vehicle is detected as an authorized vehicle by the vehicle recognizer, the vehicle guide may be configured to operate the vehicle by communicating with the vehicle, thereby automatically parking the vehicle at the connection position at a side of the entrance of the house. The vehicle guide may also be configured to operate the door of the vehicle to be opened before parking the vehicle at the connection position.

The connection system according to the present disclosure may further include a passenger recognizer disposed outside the house or inside the vehicle and configured to detect passengers within the vehicle. When the vehicle is detected as an authorized vehicle by the vehicle recognizer and passengers in the vehicle are detected as authorized passengers, the vehicle guide may be configured to guide the vehicle to the connection position at a side of the entrance of the house.

According to a connection system for a vehicle and a house according to the present disclosure, a vehicle and an opening of a house may be connected to each other when the vehicle is parked, and thus, the interior of the house expands to the interior of the vehicle. Further, since a sealing structure is provided between the vehicle and the house, it may be possible to live within the space without inconvenience.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
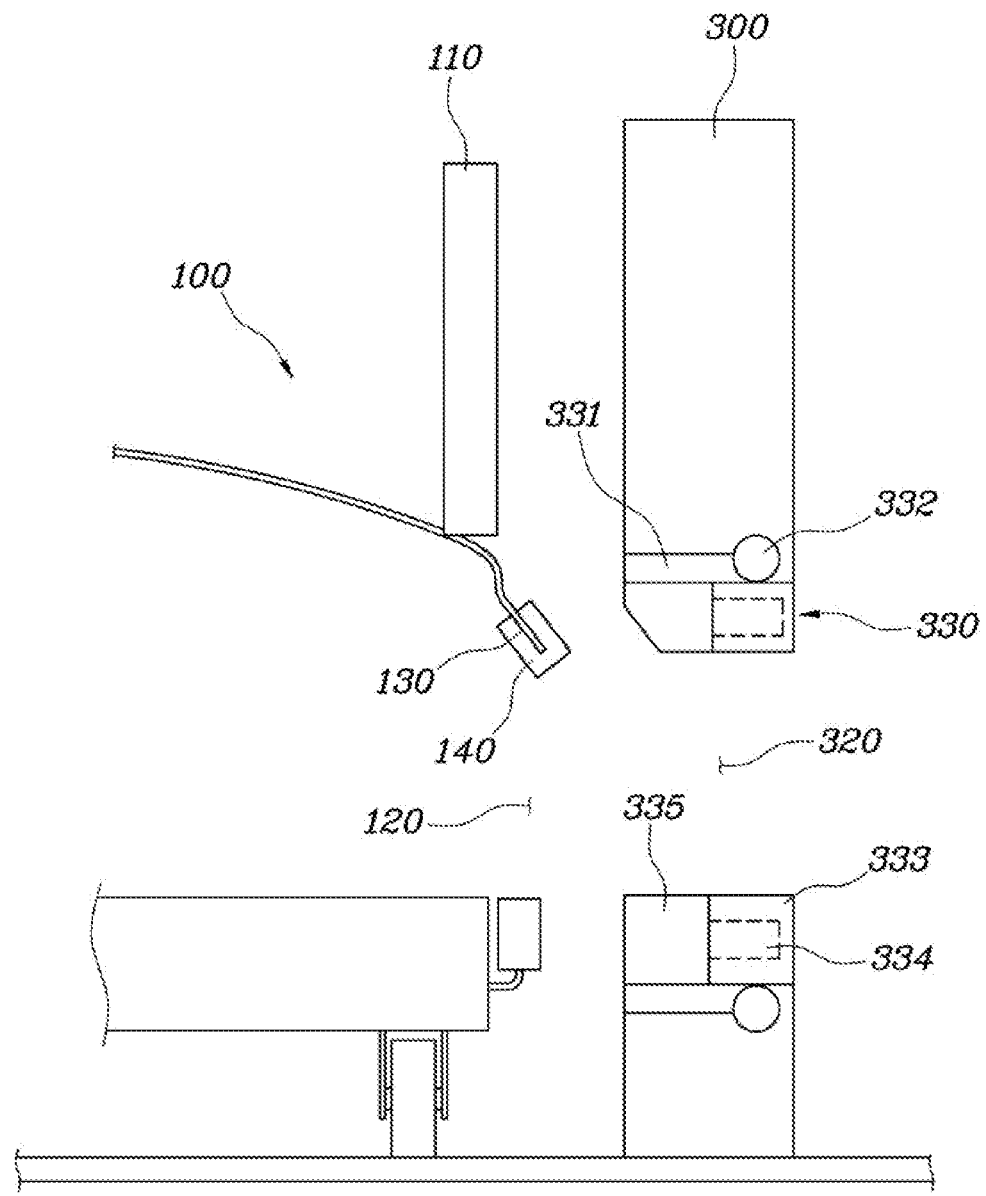
FIGS. 1 and 2 are views showing an operation process of a connection system for a vehicle and a house according to an exemplary embodiment of the present disclosure.
Figure 2:
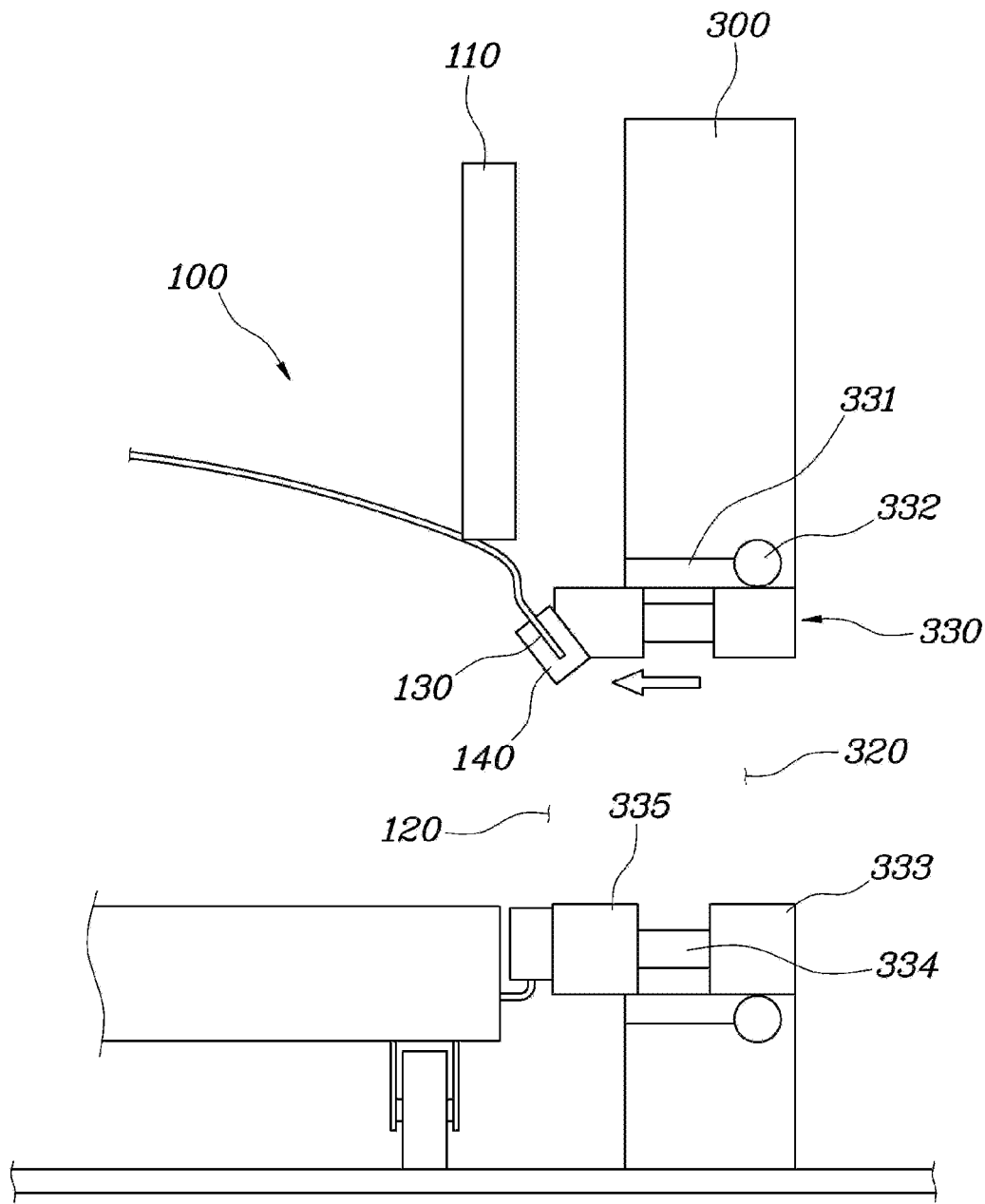
Figure 3:
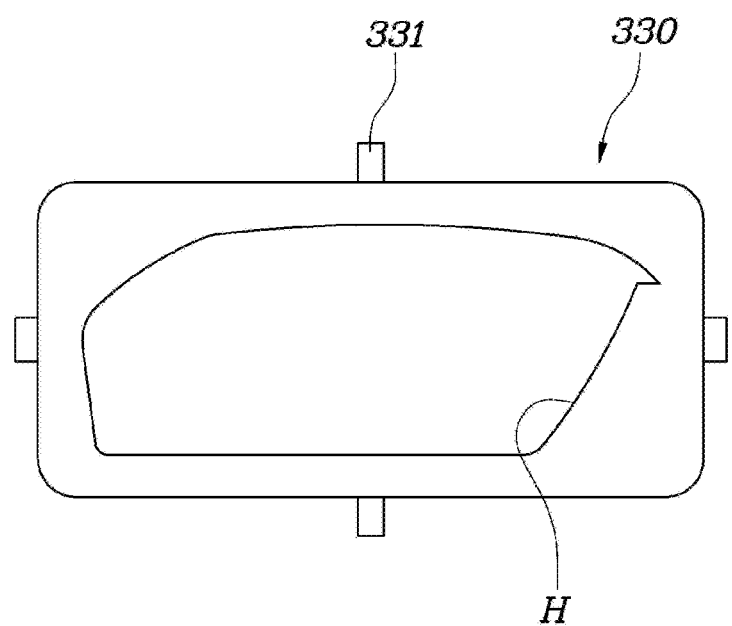
FIGS. 3 and 4 are views showing a sealing module of the connection system for a vehicle and a house according to an exemplary embodiment of the present disclosure.
Figure 4:
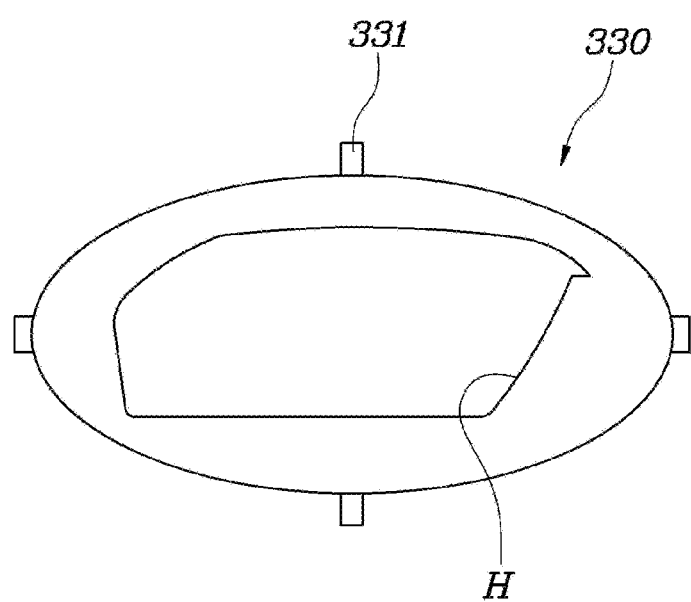
Figure 5:
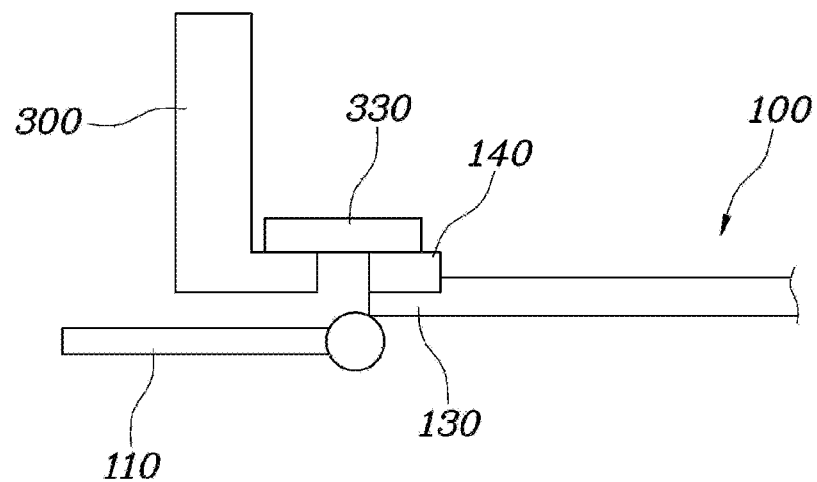
FIGS. 5 and 6 are diagrams illustrating systems for connecting a vehicle and a house according to an exemplary embodiment of the present disclosure.
Figure 5:
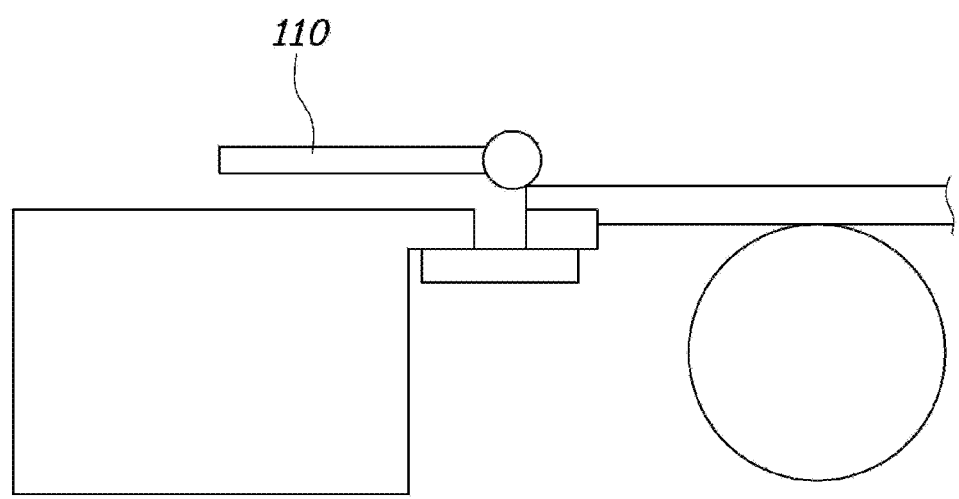
Figure 6:
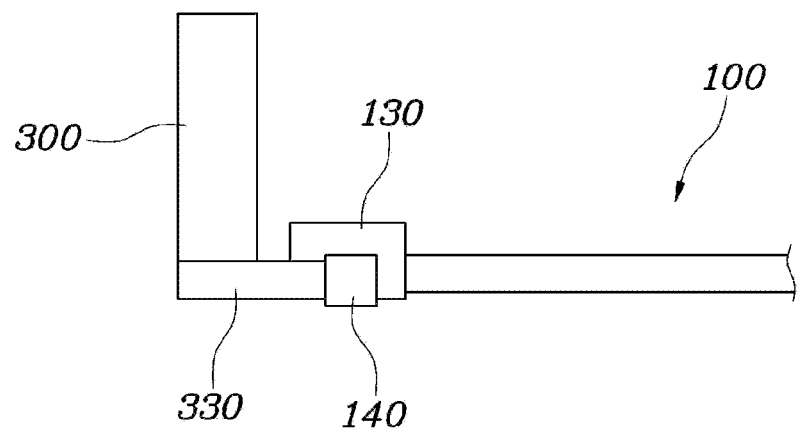
Figure 6:
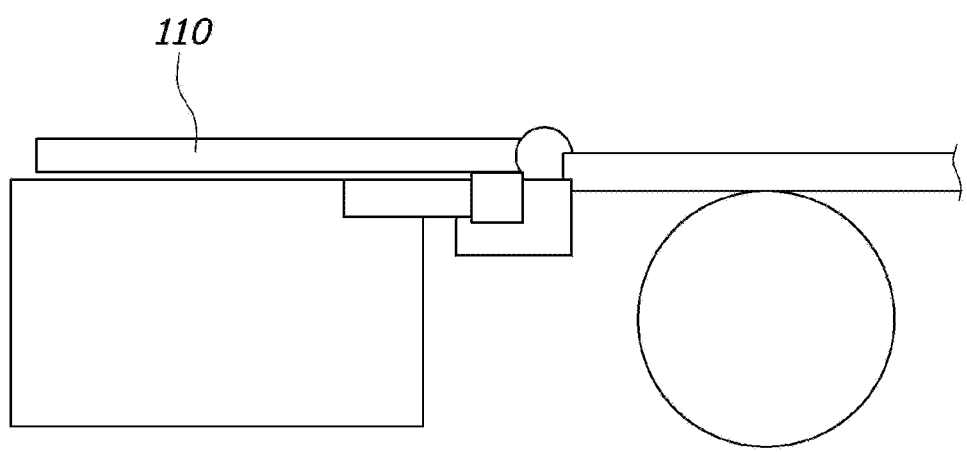
Figure 7:
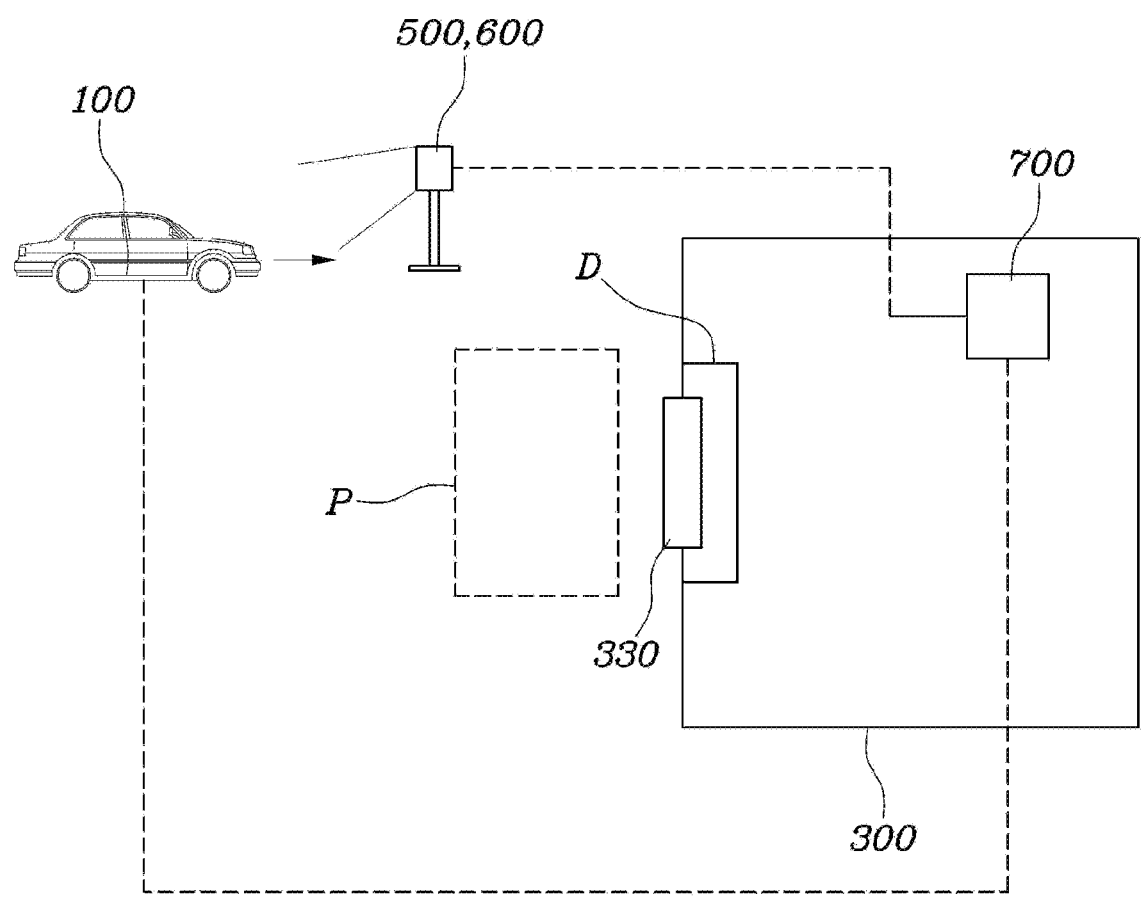
FIG. 7 is view showing the configuration of a connection system for a vehicle and a house according to an exemplary embodiment of the present disclosure.

FIGS. 1 and 2 are views showing an operation process of a connection system for a vehicle and a house according to an exemplary embodiment of the present disclosure, FIGS. 3 and 4 are views showing a sealing module of the connection system for a vehicle and a house according to an exemplary embodiment of the present disclosure, FIGS. 5 and 6 are diagrams illustrating systems for connecting a vehicle and a house according to an exemplary embodiment of the present disclosure, and FIG. 7 is view showing the configuration of a connection system for a vehicle and a house according to an exemplary embodiment of the present disclosure.

FIGS. 1 and 2 are views showing an operation process of a connection system for a vehicle and a house according to an exemplary embodiment of the present disclosure. The connection system for a vehicle and a house according to the present disclosure may include: a flange 130 provided along the edge of an opening 120 of a door 110 of a vehicle 100; a weather strip 140 disposed at the flange 130, extending along the flange 130, and exposed outside the vehicle; and a sealing module 330 disposed at an entrance 320 of a house 300, extending along the edge of the entrance 320, and sealing the portion between the vehicle opening 120 and the house entrance 320 by coming in close contact with (e.g., abutting) the weather strip 140 when the vehicle 100 and the house 300 are connected. When the vehicle 100 and the house 300 are connected with both the door 110 of the vehicle and the entrance 320 of the house open, a space is formed with the interior of the vehicle and the interior of the house connected to each other.

The system of the present disclosure proposes a new vehicle-dwelling space that enables sharing a vehicle and a house by connecting the interiors of the vehicle and the house by connecting the door 110 of the vehicle to the specific entrance 320 of the house with the vehicle 100 parked proximate to the house 300 such as a residence or other type of structure. The present disclosure is not limited to a house or residence and may be any known type of structure. The entrance 320 of the house 300 is a concept that includes an additional entrance other than a main entrance such as a veranda, a terrace, or a rear door.

Accordingly, passengers do not need to park, exit the vehicle, and enter the house, thus enhancing convenience and reinforcing security. Further, it may be possible to use the interior of the vehicle as the concept of a specific room after parking and connecting, charge the vehicle through the house, and directly operate the vehicle inside the house.

Accordingly, the vehicle 100 and the house 300 may each include a structure capable of performing docking and sealing. In particular, the vehicle 100 generally includes the door 110 to allow passenger to enter and exit the vehicle. The vehicle may be a type with a B pillar omitted and thus, the vehicle 100 may be connected to the house 300 through a wide opening. Further, the flange 130 extending along the edge of the door 110 of the vehicle may be formed on the edge. The flange 130 may be wider than the flanges of vehicles of the related art to thus be sealed with the house 300.

The weather strip 140 may be disposed at the flange 130, extend along the flange 130, and may be exposed outside the vehicle 100. The weather strips of the related art are used for sealing the portion between an opening and a door of a vehicle, but in the present disclosure, the weather strip 140 may seal the portion between the house 300 and the vehicle 100. Accordingly, the weather strip 140 may be provided throughout the wide flange 130 and requires a section exposed to the outside of the vehicle. The exposed section faces the outer wall of the house 300 to sufficiently perform the function of sealing the portion between the vehicle 100 and the house 300 when combined.

The sealing module 330 may be disposed at the entrance of the house 300. The sealing module 330 may extend along the edge of the house entrance 320 and seal the portion between the vehicle opening 120 and the house entrance 320 by coming in close contact with (e.g. abutting) the weather strip 140 when the vehicle 100 and the house 300 are connected. In other words, it may be possible to use the weather strip 140 of the vehicle 100 without applying a separate weather strip to the house 300 and the sealing module 330 capable of being installed may be disposed at the entrance 320 of the house, thus capable of corresponding to various types of vehicles. For example, when a user changes a vehicle, the shape of the door 110 is also generally changed, so in this case, it may be possible to correspond to various types of vehicles by replacing the sealing module 330 to fit to the types.

FIGS. 3 and 4 are view showing the sealing module 330 of the connection system for a vehicle and a house according to an exemplary embodiment of the present disclosure, which is exemplified in the following description. The shapes of the doors are the same but the entrance shapes of the house are different in the exemplary embodiments shown in the figures, so it may be possible to use sealing modules 330 fitting to the entrance by mounting them on the house.

Particularly, the door 110 of a vehicle may be disposed on a side of the vehicle and opened upward, and thus, the vehicle and a house may be connected with the side of the vehicle 100 and a side wall of the house 300 while being in abutting contact. FIG. 1 shows a state in which the side door 110 of the vehicle 100 slides upward proximate to the house 300 and the vehicle has been parked. FIG. 2 shows a state in which the house 300 and the vehicle 100 are connected and sealed in the above state.

Accordingly, the sealing module 330 may include stoppers 331, a locking device 332 may be disposed at the entrance 320 of the house 300, the sealing module 330 may be detachably coupled to the entrance, and the stoppers 331 may be locked by the locking device 332 when the sealing module 330 and the entrance 320 are combined, whereby the sealing module 330 may be mounted on the house 300. The sealing module 330 may be mounted first on the house 300. The sealing module 330 may be changed in accordance with the type of the house 300 and the vehicles, and thus, should be able to be mounted and separated. Accordingly, the sealing module 330 may include the stoppers 331, as shown in FIG. 1, the stoppers 331 may be inserted in the house 300 and locked and fixed in the locking device 332 at the maximum insertion depth, and thus, the sealing module 330 may be mounted more easily. To separate the sealing module later, it may be possible to separate the sealing module 330 by unlocking the locking device 332.

Further, the sealing module 330 may include a base 333, a stretching portion 334 disposed on the base 333, and a contact portion 335 coupled to an end of the stretching portion 334. When the vehicle 100 and the house 300 are connected, the contact portion 335 approaches the vehicle from the base 333 by the stretching portion 334, presses the weather strip 140 at the flange 130 of the vehicle, comes in close contact (e.g., abutting contact) with the weather strip 140, whereby the portion between the vehicle opening 120 and the house entrance 320 may be sealed. Various structures capable of expanding or stretching and contracting such as a cylinder, an electromagnet, and an air pocket may be applied to the stretching portion 334. Accordingly, the house 300 may be combined with and connected to various types of vehicles, and particularly, by sealing the joint, it may be possible to use the interior of the vehicle 100 as the interior of the house 300 without inconvenience. Further, a user may directly enter the house without exiting the vehicle.

FIGS. 5 and 6 are views showing a connection system for a vehicle and a house according to other exemplary embodiments of the present disclosure. As shown in FIG. 6, a door 110 of a vehicle is provided on the rear of the vehicle and may be opened rearward, and thus, vehicle and the house may be connected, with the rear of the vehicle 100 and a side wall of the house 300 abutting, and the door 110 of the vehicle may be opened toward the floor in the interior of the house 300. In particular, an SUV is exemplified and this vehicle may be connected to a house through the tail gate. Accordingly, the vehicle 100 moves or is operated toward the rear of the house 300 and parked, and then may be connected to the house through the door 110 on the rear. In particular, the door 110 may be turned and opened downward. First, the door 110 may be opened and connected to the house 300 and the opened door 110 is proximate to the floor of the interior of the house 300.

Accordingly, the sealing module 330 stretches toward the vehicle 100 when the vehicle 100 and the house 300 are combined. When the sealing module 330 is stretched, the flange 130 of the vehicle 100 surrounds the sealing module 330 and the outer side of the sealing module 330 abuts the weather strip 140 of the vehicle, whereby the portion between the vehicle opening 120 and the house entrance 320 may be sealed.

Further, FIG. 5 shows a clamshell type vehicle of which the tail gate may be separated to be opened. In particular, a door 110 of the vehicle may be disposed on the rear of the vehicle and may be separated and opened rearward, the vehicle 100 and the house 300 may be connected with the rear of the vehicle 100 and a side wall of the house 300 abutting. Additionally, the door 110 of the vehicle may be opened toward the interior of the house 300, so the separated door 11 may be positioned in the interior of the house 300 in the open state.

Accordingly, the sealing module 330 protrudes toward the vehicle 100, and the sealing module 330 surrounds the flange 130 from the outside and the inner side of the sealing module 330 abuts the weather strip 140 of the vehicle when the vehicle 100 and the house 300 are combined, whereby the portion between the opening 120 of the vehicle and the house entrance 320 may be sealed.

FIG. 7 is a view showing the configuration of a connection system for a vehicle and a house according to an exemplary embodiment of the present disclosure. The connection system of the present disclosure may further include a vehicle recognizer 500 disposed outside a house and configured to detect a vehicle; and a vehicle guide 700 configured to guide a vehicle 100 to a connection position at a side of a house entrance when the vehicle 100 is detected as an authorized vehicle by the vehicle recognizer 500. In particular, the vehicle recognizer 500 and the vehicle guide 700 may be part of a controller. For example, the vehicle recognizer 500 may be a type of sensor in communication with the controller mounted within the vehicle. The vehicle guide 700 may be a component within the controller of the vehicle.

In other words, when the vehicle 100 approaches the house 300, the vehicle recognizer 500 may be configured to detect the vehicle using a camera sensor etc. and searches for connection authority. When the vehicle 100 receives connection authority, the vehicle 100 may be guided to a specific position of the house 100, that is, a side of the entrance 320 to be parked. The vehicle guide 700 may be a guide light that guides parking, or it may be possible to automatically park the vehicle by actively operating the vehicle in a self-driving mode and a semi-self-driving mode.

When the vehicle is detected as an authorized vehicle by the vehicle recognizer 500, the vehicle guide 700 may be configured to operate the vehicle 100 by communicating with the vehicle 100, whereby it may be possible to automatically park the vehicle at a connection position P (park position) at a side of the entrance 320 of the house 300. Using this automatic parking function enables operating a vehicle with improved connection with the house 300 by parking the vehicle at a more accurate position.

Further, the vehicle guide 700 may be configured to operate a door of the vehicle to be opened to prepare connection of the vehicle 100 to the house 300 prior to parking the vehicle 100 at the automatic parking connection position P. Accordingly, it may be possible to prevent the vehicle from reaching a connection point at a side of the entrance 320 of the house 300 without a door being opened or prevent interference of the door opening. In other words, the vehicle guide 700 prevents interference by the house 300 when the door 110 is opened by opening the door 110 of the vehicle before parking the vehicle at the connection position P.

Meanwhile, the connection system of the present disclosure may further include a passenger recognizer 600 (e.g., a sensor) disposed outside the house 300 or inside the vehicle 100 and configured to detect passengers in the vehicle. When a vehicle is detected as an authorized vehicle by the vehicle recognizer 500 and passengers in the vehicle are detected as authorized passengers, the vehicle guide 700 may be configured to guide the vehicle to the connection position P at a side of the entrance of the house 300.

In other words, the passenger recognizer 600 may be configured to detect passenger in a vehicle using a separate external camera, a camera within the vehicle, or other smart devices, etc. When an unauthorized passenger is detected to be within the vehicle 100, the vehicle guide 700 may be configured to guide the vehicle 100 only after the unauthorized passenger exits and the vehicle 100 and the house 300 are connected, thereby being able to reinforce security. The determination of an authorized passenger may be a known authentication method such as facial recognition or the like.

According to a connection system for a vehicle and a house according to the present disclosure, a vehicle and an opening of a house may be connected to each other when the vehicle is parked, and thus, the interior of the house expands to the interior of the vehicle. Further, since a sealing structure is provided between the vehicle and the house, it may be possible to live within the space without inconvenience.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. A connection system for a vehicle and a house, comprising:
    a flange provided along an edge of an opening of a door of the vehicle;
    a weather strip disposed at the flange, extending along the flange, and exposed outside the vehicle; and
    a sealing module disposed at an entrance of the house, extending along the edge of the entrance, and sealing the portion between the vehicle opening and the house entrance by abutting the weather strip when the vehicle and the house are connected;
    a vehicle recognizer disposed outside the house and configured to detect the vehicle; and
    a vehicle guide configured to guide the vehicle to a connection position at a side of the house entrance when the vehicle is detected as an authorized vehicle by the vehicle recognizer,
    wherein when the vehicle and the house are connected with both the door of the vehicle and the entrance of the house open, a space is formed with an interior of the vehicle and an interior of the house connected to each other.

2. The connection system of claim 1, wherein the door of the vehicle is provided on a side of the vehicle and is opened upward to connect the vehicle and the house with the side of the vehicle and a side wall of the house.

3. The connection system of claim 1, wherein the door of the vehicle is provided on the rear of the vehicle and is opened rearward to connect the vehicle and the house with the rear of the vehicle and a side wall of the house, and the door of the vehicle is opened toward the floor in the interior of the house.

4. The connection system of claim 1, wherein the door of the vehicle is provided on the rear of the vehicle, is separated when opening, and is opened rearward to connect the vehicle and the house with the rear of the vehicle and a side wall of the house close, and the door of the vehicle is opened toward the interior of the house and the separate door is positioned in the interior of the house in an opening state.

5. The connection system of claim 1, wherein the sealing module includes stoppers, a locking device is disposed at the entrance of the house, the sealing module is detachably coupled to the entrance, the stoppers are locked by the locking device when the sealing module and the entrance are combined, and the sealing module is mounted on the house.

6. The connection system of claim 1, wherein the sealing module includes:
    a base;
    a stretching portion disposed on the base; and
    a contact portion coupled to an end of the stretching portion,
    wherein when the vehicle and the house are connected, the contact portion approaches the vehicle from the base by the stretching portion and abuts the weather strip to seal the portion between the vehicle opening and the house entrance.

7. The connection system of claim 1, wherein the sealing module protrudes toward the vehicle, and the sealing module surrounds the flange and the inner side of the sealing module abuts the weather strip of the vehicle when the vehicle and the house are combined to seal the portion between the opening of the vehicle and the house entrance.

8. The connection system of claim 1, wherein the sealing module stretches toward the vehicle when the vehicle and the house are combined, and when the sealing module is stretched, the flange of the vehicle surrounds the sealing module and the outer side of the sealing module abuts the weather strip of the vehicle to seal the portion between the vehicle opening and the house entrance.

9. The connection system of claim 1, wherein when the vehicle is detected as an authorized vehicle by the vehicle recognizer, the vehicle guide is configured to operate the vehicle by communicating with the vehicle to automatically park the vehicle at the connection position at the side of the entrance of the house.

10. The connection system of claim 9, wherein the vehicle guide is configured to operate the door of the vehicle to be opened before parking the vehicle at the connection position.

11. The connection system of claim 1, further comprising:
a passenger recognizer disposed outside the house or inside the vehicle and configured to detect passengers within the vehicle,
wherein when the vehicle is detected as an authorized vehicle by the vehicle recognizer and passengers within the vehicle are detected as authorized passengers, the vehicle guide is configured to guide the vehicle to the connection position at the side of the entrance of the house.

12. A connection system for a vehicle and a house, comprising:
a flange provided along an edge of an opening of a door of the vehicle;
a weather strip disposed at the flange, extending along the flange, and exposed outside the vehicle; and
a sealing module disposed at an entrance of the house, extending along the edge of the entrance, and sealing the portion between the vehicle opening and the house entrance by abutting the weather strip when the vehicle and the house are connected;
wherein when the vehicle and the house are connected with both the door of the vehicle and the entrance of the house open, a space is formed with an interior of the vehicle and an interior of the house connected to each other; and
wherein 1) the door of the vehicle is provided on a side of the vehicle and is opened upward to connect the vehicle and the house with the side of the vehicle and a side wall of the house, or 2) the door of the vehicle is provided on the rear of the vehicle and is opened rearward to connect the vehicle and the house with the rear of the vehicle and a side wall of the house, and the door of the vehicle is opened toward the floor in the interior of the house, or 3) the door of the vehicle is provided on the rear of the vehicle, is separated when opening, and is opened rearward to connect the vehicle and the house with the rear of the vehicle and a side wall of the house close, and the door of the vehicle is opened toward the interior of the house and the separate door is positioned in the interior of the house in an opening state.

13. The connection system of claim 12, wherein the door of the vehicle is provided on a side of the vehicle and is opened upward to connect the vehicle and the house with the side of the vehicle and a side wall of the house.

14. The connection system of claim 12, wherein the door of the vehicle is provided on the rear of the vehicle and is opened rearward to connect the vehicle and the house with the rear of the vehicle and a side wall of the house, and the door of the vehicle is opened toward the floor in the interior of the house.

15. The connection system of claim 12, wherein the door of the vehicle is provided on the rear of the vehicle, is separated when opening, and is opened rearward to connect the vehicle and the house with the rear of the vehicle and a side wall of the house close, and the door of the vehicle is opened toward the interior of the house and the separate door is positioned in the interior of the house in an opening state.

* * * * *